United States Patent
Zhang et al.

(10) Patent No.: US 11,860,747 B2
(45) Date of Patent: Jan. 2, 2024

(54) METHOD AND APPARATUS FOR PERFORMING POWER STRESS TEST ON FPGA ACCELERATION CARD, AND STORAGE MEDIUM

(71) Applicant: INSPUR SUZHOU INTELLIGENT TECHNOLOGY CO., LTD., Jiangsu (CN)

(72) Inventors: Jingdong Zhang, Jiangsu (CN); Jiangwei Wang, Jiangsu (CN); Hongwei Kan, Jiangsu (CN); Yaming Xu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 73 days.

(21) Appl. No.: 18/012,923

(22) PCT Filed: May 27, 2021

(86) PCT No.: PCT/CN2021/096272
§ 371 (c)(1),
(2) Date: Dec. 25, 2022

(87) PCT Pub. No.: WO2022/028053
PCT Pub. Date: Feb. 10, 2022

(65) Prior Publication Data
US 2023/0195585 A1 Jun. 22, 2023

(30) Foreign Application Priority Data
Aug. 7, 2020 (CN) .......................... 202010793010.0

(51) Int. Cl.
*G06F 11/00* (2006.01)
*G06F 11/22* (2006.01)

(52) U.S. Cl.
CPC ................. *G06F 11/2221* (2013.01)

(58) Field of Classification Search
CPC .................................................. G06F 11/2221
See application file for complete search history.

(56) References Cited

U.S. PATENT DOCUMENTS

| 10,324,436 B2 | 6/2019 | Oliverio et al. |
| 10,608,640 B1 | 3/2020 | Orthner et al. |
| (Continued) | | |

FOREIGN PATENT DOCUMENTS

| CN | 101788931 A | 7/2010 |
| CN | 105807263 A | 7/2016 |
| (Continued) | | |

OTHER PUBLICATIONS

Shengyu Zhou. "A Dynamically Partial Reconfigurable System Based on FPGA." A doctor's dissertation. Chinese Academy of Science. Nov. 2006.

*Primary Examiner* — Loan L. T. Truong
(74) *Attorney, Agent, or Firm* — IPRO, PLLC (57) ABSTRACT

A method and apparatus for performing a power stress test on an FPGA acceleration card and a computer-readable storage medium. The method includes: dividing, according to a partial reconfiguration method, a hardware resource of an FPGA acceleration card into a static region serving as a hardware logic implementation region for performing a normal function test, and a dynamic PR region including a blank mode occupying no hardware resource and a power test mode for performing a power stress test, and burning FPGA firmware having a partial reconfiguration function to a flash memory; upon receiving a request for power stress test, configuring an operation mode of the dynamic PR region to be the power test mode, loading, to the dynamic PR region, a dynamic PR configuration file burned in the flash (Continued)

memory; and calling a power stress test module to execute the power stress test in the dynamic PR region.

20 Claims, 3 Drawing Sheets

(56) References Cited

U.S. PATENT DOCUMENTS

| | | | |
|---|---|---|---|
| 2009/0058443 A1* | 3/2009 | Ohashi | G11C 29/44 |
| | | | 324/750.05 |
| 2016/0293274 A1* | 10/2016 | Schuh | G11C 29/44 |
| 2017/0123394 A1 | 5/2017 | Oliverio et al. | |
| 2018/0302281 A1* | 10/2018 | Khan | G06F 30/327 |
| 2020/0374191 A1* | 11/2020 | Khan | G06F 30/392 |

FOREIGN PATENT DOCUMENTS

| | | |
|---|---|---|
| CN | 104598310 B | 8/2017 |
| CN | 109739581 A | 5/2019 |
| CN | 111176919 A | 5/2020 |
| CN | 111258830 A | 6/2020 |
| CN | 111984480 A | 11/2020 |

\* cited by examiner

METHOD AND APPARATUS FOR PERFORMING POWER STRESS TEST ON FPGA ACCELERATION CARD, AND STORAGE MEDIUM

CROSS-REFERENCE TO RELATED APPLICATIONS

The present application is a National Stage of International Application No. PCT/CN2021/096272, filed on May 27, 2021, which claims the benefit of priority to Chinese patent application No. 202010793010.0 filed on Aug. 7, 2020 before the CNIPA, China National Intellectual Property Administration, entitled "METHOD AND APPARATUS FOR PERFORMING POWER STRESS TEST ON FPGA ACCELERATION CARD, AND STORAGE MEDIUM", both of which are incorporated herein by reference in their entireties.

TECHNICAL FIELD

The present disclosure relates to the field of power stress tests, in particular to a method and apparatus for performing a power stress test on an FPGA acceleration card, and a storage medium.

BACKGROUND

As field programmable gate arrays (FPGAs) are increasingly used in the field of heterogeneous computing, FPGA-based acceleration cards are widely used in data centers. When produced in batches to be applied to the data centers, the FPGA-based acceleration cards need to undergo, through hardware, software, system and so on, various tests, such as a board signal integrity test, various functional stress tests, a power integrity test, a safety test, and a power and heat dissipation test. The power and heat dissipation test is an important test for testing whether heat dissipation strategies of a server and a heat sink of an FPGA-based acceleration card in an overall environment of the server meet the requirements of the entire system. To implement the power and heat dissipation test in the overall environment, various tests are generally performed at 1.2 times the maximum power designed for the board. Moreover, firmware for board test must support the signal integrity test, various functional stress tests and the like.

Figure 1:
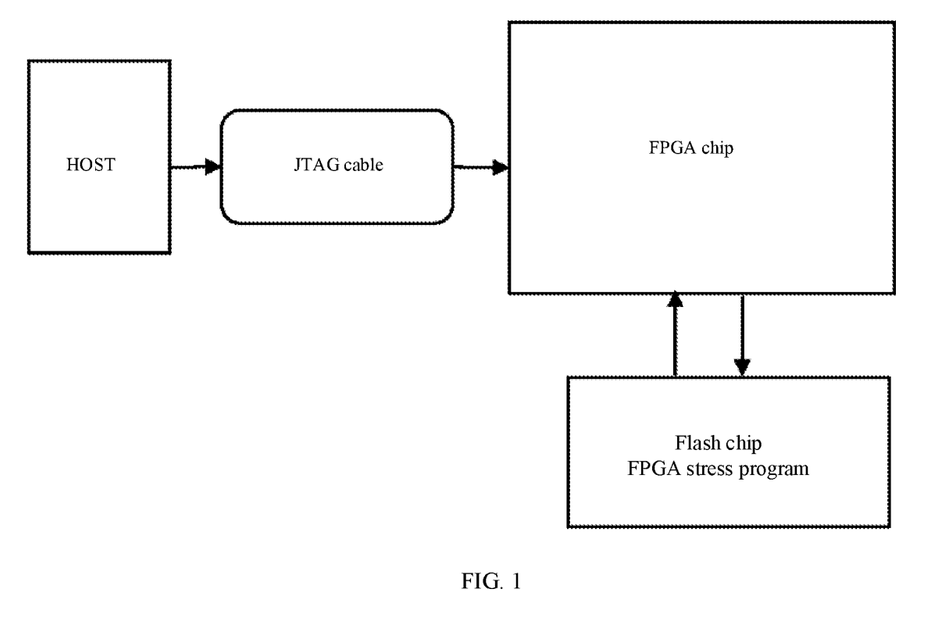
FIG. 1 is a schematic frame diagram illustrating a method for updating FPGA profiles by JTAG in the related art.

For traditional central processing unit (CPU) chips, dedicated test software, such as power thermal utility (PTU) software, running under an operating system is generally used for implementing power stress tests. When a power stress test is required, CPU power may be improved for related tests by installing and running the software in the system, starting a stress program, and setting stress parameters. Different from the traditional CPU chips, FPGA chips have configurable internal hardware logic resources, so that users may design firmware versions occupying different hardware logic resources according to different service requirements, and the power of each firmware is also different. The power of the FPGA may increase with the increase of hardware logic resources required by the design of the FPGA, such as a register and a look up table (LUT). Moreover, the power of the FPGA may also increase with the increase of the frequency of a master clock used by the FPGA. Therefore, in the related art, a method for performing power and heat dissipation test by stressing the FPGA acceleration card is to improve the usage of internal hardware resources of the FPGA acceleration card and the frequency of the master clock used by the hardware resources. However, firmware used for power stress test on the FPGA acceleration card may only be used for the power and heat dissipation test in the overall machine environment, and may not be used for the signal integrity test, the power integrity test and other functional tests. As shown in FIG. 1, an FPGA acceleration card may not store a firmware program, an FPGA stress program needs to be stored in an external non-transitory storage devices such as a Flash (NOR Flash) chip, and the HOST burns FPGA stress firmware into the Flash chip through a joint test action group (JTAG) cable, so as to enable multiple long-time tests in the overall environment of the system.

In the related art, during an FPGA power stress test, in order to increase the power of an FPGA acceleration card, the FPGA stress program may generally use a lot of hardware resources in the FPGA acceleration card, such as LUT, registers, a random access memory (RAM), and a digital signal processing (DSP). Once these hardware resources are instantiated in FPGA engineering design, the static power of the FPGA may increase. This is also the reason why the more hardware resources used in the FPGA, the greater the power, which also limits the power thereof to a target level. Although the power of the FPGA may be slightly adjusted by adjusting the master clock of the FPGA, the power of the FPGA board may not be adjusted to a large extent. In order to adjust the power level of the FPGA, the FPGA project has to be redesigned, the usage of hardware resources is adjusted to change the power level, and then a new program is cured into the Flash chip through JTAG. Moreover, because such tests need to support all the complete functional items of a board and exclusive signal test functional items, and the use environment is not necessarily the overall heat dissipation environment of the server, a FPGA program generated by an existing FPGA stress method is generally not suitable for the signal integrity test, functional pressure test, etc. Even if the flip enable count of the register driven by the master clock of the FPGA is adjusted, firmware with a power stress function may not be directly used. Since hardware resources that may be driven are included when the FPGA is compiled, the static power generated by this part is still very high.

In view of this, a technical problem to be solved by those skilled in the art is how to execute, by directly using firmware with a power stress function, a power stress test on the FPGA acceleration card without increasing the static power of the FPGA acceleration card.

SUMMARY

The present disclosure provides a method and apparatus for performing a power stress test on an FPGA acceleration card, and a computer-readable storage medium, through which the power stress test is executed for the FPGA acceleration card by directly using firmware with a power stress function without increasing the static power of the FPGA acceleration card.

In view of the above problems, the following solutions are provided by embodiments of the present disclosure.

An aspect of the embodiments of the present disclosure provides a method for performing a power stress test on a field programmable gate array (FPGA) acceleration card, including:

dividing, according to a partial reconfiguration (PR) method, the FPGA acceleration card into a static region and a dynamic PR region in advance, and burning FPGA firmware with a partial reconfiguration function to a Flash memory;

in response to receiving a request for power stress test, setting an operating mode of the dynamic PR region as a power test mode, and loading dynamic PR profiles burned in the Flash memory to the dynamic PR region; and calling power stress test modules to execute the request for power stress test in the dynamic PR region, where the static region is a hardware logic implementation region for functional tests other than the power stress test, the dynamic PR region includes a blank mode occupying no hardware resource and the power test mode for performing the power stress test, and the dynamic PR region the blank mode is used for performing a test other than the power stress test in conjunction with the static region.

In some embodiments, the burning FPGA firmware with the partial reconfiguration function to the Flash memory includes:

in response to receiving an instruction for configuring power stress test modules transmitted from HOST, generating a plurality of power stress test modules occupying different amounts of logic resources for the dynamic PR region, where the plurality of power stress test modules are served as hardware logic for the dynamic PR region operating in the power test mode; and generating, by jointly compiling the dynamic PR region operating in the blank mode with the static region, FPGA profiles and profiles of the dynamic PR region in the blank mode that are served as the FPGA firmware with the partial reconfiguration function, and burning and curing the FPGA firmware to the Flash memory.

In some embodiments, after generating the plurality of power stress test modules occupying different amounts of logic resources for the dynamic PR region, the method further includes:

generating dynamic PR profiles of various power stress levels by jointly compiling the plurality of power stress test modules with the static region, the dynamic PR profiles are burned and cured to the Flash memory in advance, or are burned and cured to the Flash memory upon receiving the request for power stress test.

In some embodiments after generating the plurality of power stress test modules occupying different amounts of logic resources for the dynamic PR region, the method further includes:

automatically configuring, in response to receiving an instruction for configuring power stress parameters transmitted from the HOST, corresponding stress parameters for power stress test modules of the same level to control a power value of the FPGA acceleration card.

In some embodiments, the static region includes peripheral component interconnect express (PCIe), a double data rate (DDR) driver, an optical module driver, and a reconfiguration module; only a connection interface is reserved between the static region and the dynamic PR region;

where the reconfiguration module is configured to cause the HOST to load, according to the partial reconfiguration method, the dynamic PR profiles to the dynamic PR region through the PCIe.

In some embodiments, the setting the operating mode of the dynamic PR region as the power test mode includes:

in response to a mode adjustment instruction transmitted from the HOST, configuring, through the PCIe, the operating mode of the dynamic PR region as the power test mode.

Another aspect of the embodiments of the present disclosure provides an apparatus for performing a power stress test on a field programmable gate array (FPGA) acceleration card, including:

a region pre-division module, configured to: divide the FPGA acceleration card into a static region and a dynamic partial reconfiguration (PR) region according to a partial reconfiguration method; and burn FPGA firmware with a partial reconfiguration function to a Flash memory, the static region being a hardware logic implementation region for a functional test other than the power stress test, the dynamic PR region including a blank mode occupying no hardware resource and a power test mode for performing the power stress test, where the dynamic PR region in the blank mode is used for performing tests other than the power stress test in conjunction with the static region;

a stress test configuration module, configured to: in response to receiving a request for power stress test, set an operating mode of the dynamic PR region as the power test mode; and load dynamic PR profiles burned in the Flash memory to the dynamic PR region; and a power stress test execution module, configured to call power stress test modules to execute the power stress test in the dynamic PR region.

In some embodiments, the region pre-division module includes:

a power stress hardware logic setting sub-module, configured to generate, in response to receiving an instruction for configuring power stress test modules transmitted from the HOST, a plurality of power stress test modules occupying different amounts of logic resources for the dynamic PR region, the plurality of power stress test modules being as hardware logic for the dynamic PR region operating in the power test mode; and a firmware burning sub-module, configured to: generate, by jointly compiling the dynamic PR region operating in the blank mode with the static region, FPGA profiles and profiles of the dynamic PR region in the blank mode, the FPGA profiles and the profiles of the dynamic PR region in the blank mode being served as the FPGA firmware with the partial reconfiguration function; and burn and cure the FPGA firmware to the Flash memory.

Embodiments of the present disclosure further provide an apparatus for performing a power stress test on a field programmable gate array (FPGA) acceleration card, including a processor, the processor being configured to, when performing a computer program stored in a memory, implement the steps of the method for performing the power stress test on the FPGA acceleration card described above.

Embodiments of the present disclosure further provide a computer-readable storage medium storing programs for performing power stress test on a field programmable gate array (FPGA) acceleration card, where the programs for performing power stress test on the FPGA acceleration card, when executed by a processor, implements the steps of the method for performing the power stress test on the FPGA acceleration card described above.

The technical solutions provided by the present application have the following advantages: internal hardware resources of an FPGA are divided into a static region and a dynamic PR region through FPGA partial reconfiguration, and power stress test modules are fixed in the dynamic PR region for implementation, facilitating replacement of the power stress test modules of different levels; and the FPGA static region may be jointly compiled with the power stress test modules of different levels to generate power stress profiles of different levels. FPGA profiles generated by compiling the dynamic PR region in a blank mode are applicable to test fields that do not require power stress, and may not increase the static power of a board. A user only needs to burn the firmware once to the Flash, and later may flexibly control whether to stress the FPGA through an upper layer of the HOST, avoiding the use of a JTAG cable to load and switch FPGA firmware with different functions. Dynamic PR profiles generated by jointly compiling the power stress test modules are applicable to test fields that require power stress. After a FPGA project is cured to the Flash, the dynamic PR region needs to be reconfigured as a power stress mode through PCIe, realizing the purpose of applying unified test firmware to different test fields, shortening the test time of each test field, improving the efficiency of each test item, and simplifying the development and maintenance of the test firmware.

In addition, embodiments of the present disclosure further provide a corresponding implementation apparatus for the method for performing the power stress test on the FPGA acceleration card, and a computer-readable storage medium, further making the method more practical. The apparatus and the computer-readable storage medium have the corresponding advantages.

It is to be understood that the foregoing general description and the following detailed description are merely exemplary, and are not restrictive of the present disclosure.

BRIEF DESCRIPTION OF THE DRAWINGS

The accompanying drawings as used in the description of embodiments of the present disclosure or related art will be briefly introduced below so as to clearly illustrate solutions of the embodiments or related art. It is apparent that the accompanying drawings in the following description illustrate merely some embodiments of the present disclosure, and those skilled in the art may obtain other accompanying drawings based on these accompanying drawings without paying any creative efforts. In the figures.

DETAILED DESCRIPTION

In order to enable those skilled in the art to better understand the solution of the present application, the present application will be further described in detail below in conjunction with the accompanying drawings and specific embodiments. Apparently, only a part of the embodiments, not all the embodiments of the present application, are described. All other embodiments obtained, based on the embodiments described in the present application, by those skilled in the art without paying creative efforts shall fall within the protection scope of the present application.

The terms "first", "second", "third" and "fourth" as used in the description, claims and the above drawings of the present disclosure are used to distinguish different objects, rather than indicating a specific order. Furthermore, the terms "comprising" and "having", and any variations thereof, are intended to indicate a non-exclusive inclusion. For example, a process, method, system, product, or device comprising a series of steps or units is not limited to the listed steps or units, but may include unlisted steps or units.

After having introduced the technical solutions of the embodiments of the present disclosure, various non-limiting implementations of the present application will be described in detail below.

Figure 2:
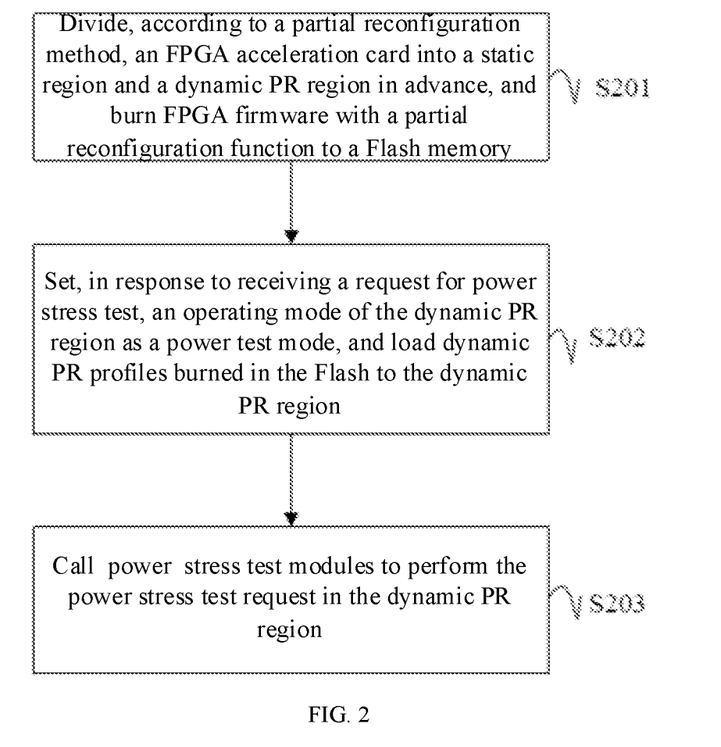
FIG. 2 is a schematic flow diagram illustrating a method for performing a power stress test on an FPGA acceleration card according to an embodiment of the present disclosure.
Figure 3:
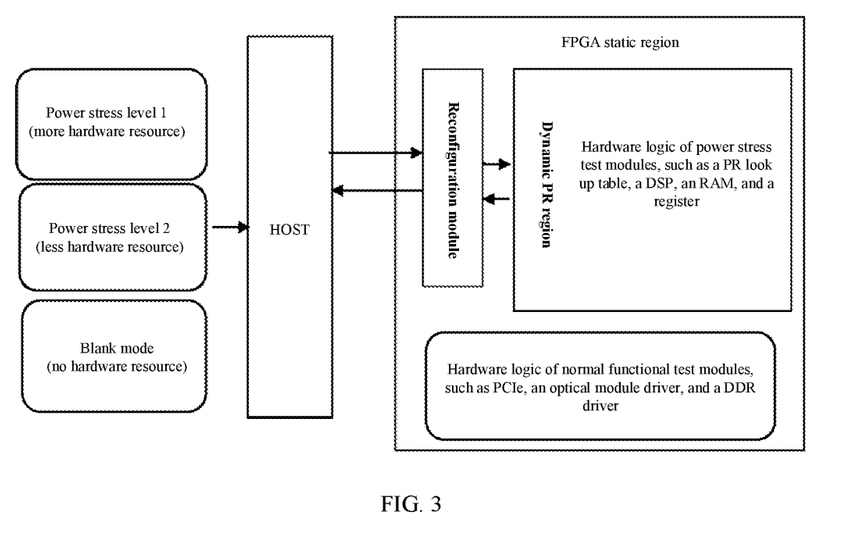
FIG. 3 is a schematic frame diagram illustrating a method for updating FPGA profiles by JTAG according to an embodiment of the present disclosure.

First, referring to FIG. 2 that is a schematic flow diagram illustrating a method for performing a power stress test on an FPGA acceleration card according to an embodiment of the present disclosure, the embodiment of the present disclosure may include contents described below.

In S201, the FPGA acceleration card is divided, according to a partial reconfiguration (PR) method, into a static region and a dynamic PR region in advance, and FPGA firmware with a partial reconfiguration function is burned to a Flash memory.

In this step, internal hardware resources of the FPGA are divided into the static region and the dynamic PR region through FPGA partial reconfiguration. FPGA partial reconfiguration (PR) is a loading technology that may be used for reconfiguring local regions in the FPGA dynamically. This technology allows to redownload profiles in a partial reconfiguration region without affecting normal operation of other regions, realizing the function of switching among different services. This technology is quite suitable for time division multiplexing of internal hardware resources of the FPGA to implement a complex system with different functions, and may effectively reduce the hardware resource overheads for system implementation. For example, the FPGA chip may be divided into a region A and a region B, where A is the FPGA static region, and B is the dynamic PR region that may be partially reconfigured. The region B may reload PR profile 1 and PR profile 2 without affecting the normal operation of modules in the region A, realizing the function of switching between services running in the region B.

The static region of the present disclosure is a hardware logic implementation region for functional tests other than the power stress tests, for example normal functional tests such as the signal integrity test, the power integrity test and the like. The dynamic PR region may include a blank mode occupying no hardware resource and a power test mode for performing the power stress test, and is used as a hardware logic implementation region for the power stress test. The blank mode is used for performing tests other than the power stress test in conjunction with the static region. That is, in the overall server environment, when the power stress test, such as a heat dissipation test, a system stress test, and a safety test, needs to be executed for the FPGA, the dynamic PR region is reconfigured as power stress test modules of different levels, and operates in the power test mode, so as to meet the needs of different test items. In other test items that do not require an FPGA power stress function, such as the signal integrity test, the power integrity test and a basic board ex-factory test, profiles of dynamic PR region in a default operating status, that is, the blank mode, may be used, or the dynamic PR region is configured as the blank mode in response to an upper-level instruction, and the power stress test modules are removed so as to perform other test items in an environment other than the overall server environment. In this way, test firmware for the FPGA acceleration card is unified, and development and maintenance of the test firmware are simplified.

In this step, the dynamic PR region includes two operating modes, and the blank mode may be set as the default mode. The so-called default mode refers to that the operating status of the dynamic PR region is the blank mode by default unless the dynamic PR region is set. Of course, the operating mode of the dynamic PR region may be set according to the upper-level instruction. The dynamic PR region in the blank mode in conjunction with the static region may be used to compile a FPGA project as a project version including various functional test modules, so as to generate profiles of the entire FPGA and profiles of the dynamic PR region in the blank mode for use in test fields where the power stress is not required. The profiles of the entire FPGA are burned to the Flash and cured, so that the dynamic PR region is in the blank mode by default after being powered on, the FPGA is not stressed, and all other functions are normal, which is for tests that do not require power stress. Initial FPGA firmware with the PR function is burned to the Flash, so that whether to stress the FPGA may be flexibly controlled by an upper layer, avoiding using a JTAG cable to load and switch FPGA firmware with different functions.

In S202, in response to receiving a request for power stress test, the operating mode of the dynamic PR region is set as the power test mode, and dynamic PR profiles burned into the Flash are loaded to the dynamic PR region.

In this step, driver software may be pre-installed on the HOST and served as upper application software, and the dynamic PR region is reconfigured through peripheral component interconnect express (PCIe). The upper application software on the HOST may be used to load PR profiles for different operating modes to the dynamic PR region of the FPGA through PCIe, so as to meet different test items. For tests that require power stress, the operating mode of the dynamic PR region may be reconfigured through PCIe based on the driver software on the HOST, and power stress files of different levels are loaded according to power stress test requirements of users.

In S203, the power stress test is executed in the dynamic PR region by calling power stress test modules.

The power stress test modules of the embodiment are fixed in the dynamic PR region. When a power stress test, such as the heat dissipation test, needs to be executed, after the dynamic PR region is configured in S202, the power stress test is executed in the dynamic PR region.

In the technical solution provided by the embodiment of the present disclosure, the internal hardware resources of the FPGA are divided into the static region and the dynamic PR region through FPGA partial reconfiguration, and the power stress test modules are fixed in the dynamic PR region for implementation, facilitating replacement of power stress test modules of different levels. The FPGA static region may compile in conjunction with the power stress test modules of different levels, so as to generate power stress profiles of different levels. FPGA profiles compiled and generated by the dynamic PR region in the blank mode are applicable to test fields that do not require power stress, and the static power of a board will not be increased. A user only needs to burn the firmware once to the Flash, and later may flexibly control whether to stress the FPGA through an upper layer of the HOST, avoiding using a JTAG cable to load and switch FPGA firmware with different functions. Dynamic PR profiles jointly compiled and generated by the power stress test modules are applicable to test fields that require power stress. After the FPGA project is cured to the Flash, the dynamic PR region needs to be configured as the power stress mode through PCIe, realizing the purpose of applying unified test firmware to different test fields, shortening the test time of each test field, improving the efficiency of each test item, and simplifying the development and maintenance of the test firmware.

It should be noted that the steps of the present application are not necessarily to be strictly performed in a sequential execution order, and these steps may be executed simultaneously or may be executed in a pre-set order, as long as they conform to the logical order. FIG. 1 is merely a schematic way, and does not represent only the steps can only be executed in such an execution order.

In the above embodiment, a partial reconfiguration region is divided from the internal hardware resources of the FPGA through FPGA partial reconfiguration, and served as the hardware logic implementation region of the power stress test modules, PR is introduced into the power stress test, and the power stress test modules are fixed in the PR region for implementation, facilitating replacement of the power stress test modules of different levels. On the other hand, other test items such as the signal integrity test and the power integrity test are implemented in the FPGA static region. In an implementation, in order to further improve the flexibility of the FPGA power stress test, on the basis of the above embodiment, the present application may further include the following steps.

In response to receiving an instruction for configuring power stress test modules transmitted from the HOST, a plurality of power stress test modules occupying different amounts of logic resources are generated for the dynamic PR region, and served as hardware logic for the dynamic PR region operating in the power test mode. After the plurality of power stress test modules of different levels are generated, corresponding stress parameters may be automatically configured for power stress test modules of the same level in response to receiving an instruction for configuring power stress parameters transmitted from the HOST, so as to control a power value of the FPGA acceleration card.

The dynamic PR region operating in the blank mode and the static region are jointly compiled to generate FPGA profiles and profiles for dynamic PR region in the blank mode, which are served as the FPGA firmware with the partial reconfiguration function, and the FPGA firmware is burnt and cured to the Flash.

The plurality of power stress test modules and the static region are jointly compiled to generate dynamic PR profiles of various power stress levels. The dynamic PR profiles may be burned and cured to the Flash in advance, or may be burned and cured to the Flash upon receiving the request for power stress test.

In the embodiment, power stress test modules of different levels may be generated according to requirements, for example, the following two different levels are used: about 30% of hardware logic resources in the dynamic PR region; and about 80% of the hardware logic resources. The power stress test modules of the two different levels are used as hardware logic of the dynamic PR region, and are jointly compiled with the static region FPGA project to generate power stress profiles of two levels for the dynamic PR region. The power stress test modules of different levels may be flexibly configured through the upper driver software, and different stress parameters may be configured for power stress programs corresponding to the same level, so that FPGA power is more accurately controlled.

In another implementation, the static region may include peripheral component interconnect express (PCIe), a double data rate (DDR) driver, an optical module driver, and a reconfiguration module. Only a connection interface is reserved between the static region and the dynamic PR region, and no other hardware logic resource in the regions is used. PCIe is used as a data communication interface and an instruction issuing interface between the HOST and the FPGA acceleration card. For example, the operating mode of the dynamic PR region may be configured, based on a mode adjustment instruction transmitted from the HOST, as the power test mode through PCIe. The DDR driver is configured to drive a double data rate memory. The optical module driver is configured to drive various optical modules in the FPGA acceleration card. The reconfiguration module is configured to cause the HOST, based on the partial reconfiguration method, to load the dynamic PR profiles to the dynamic PR region through PCIe.

In this embodiment, the power stress program and a normal functional item test program are unified, the development and maintenance of FPGA firmware in different test fields during the development and test phase of FPGA boards is simplified, the FPGA power level are flexibly configured through the dynamic PR region, and the adjustable range of the FPGA power test is further expanded. By means of PR, the blank mode is regarded as power level 0, and may be used in other test fields that do not require FPGA power stress.

An embodiment of the present disclosure further provides an apparatus corresponding to the method for performing the power stress test on the FPGA acceleration card, making the method more practical. The apparatus may be described in terms of functional modules and hardware. An apparatus for performing a power stress test on an FPGA acceleration card according to the embodiment of the present disclosure is described below. The apparatus for performing the power stress test on the FPGA acceleration card described below and the method for performing the power stress test on the FPGA acceleration card described above may be cross-referenced.

Figure 4:
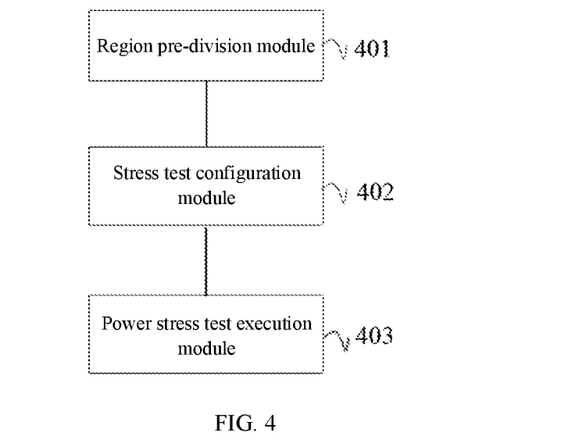
FIG. 4 is a structural diagram illustrating a specific implementation of an apparatus for performing a power stress test on an FPGA acceleration card according to an embodiment of the present disclosure.

In term of functional modules, referring to FIG. 4, which is a structural diagram illustrating a specific implementation of the apparatus for performing the power stress test on the FPGA acceleration card provided by the embodiment of the present disclosure, the apparatus may include a region pre-division module 401, a stress test configuration module 402 and a power stress test execution module 403.

The region pre-division module 401 is configured to: divide the FPGA acceleration card into a static region and a dynamic PR region according to a partial reconfiguration method; and burn FPGA firmware with a partial reconfiguration function to the Flash, the static region being a hardware logic implementation region for a functional test other than power stress test, the dynamic PR region including a blank mode occupying no hardware resource and a power test mode for performing the power stress test, the dynamic PR region in the blank mode being used for execute a test other than the power stress tests in conjunction with the static region.

The stress test configuration module 402 is configured to: in response to receiving a request for power stress test, set an operating mode of the dynamic PR region as the power test mode; and load dynamic PR profiles burned into the Flash to the dynamic PR region.

The power stress test execution module 403 is configured to call power stress test modules to execute the power stress test in the dynamic PR region.

In some implementations of this embodiment, the region pre-division module 401 may include a power stress hardware logic setting sub-module and a firmware burning sub-module.

The power stress hardware logic setting sub-module is configured to: in response to receiving an instruction for configuring power stress test modules transmitted from the HOST, generate a plurality of power stress test modules occupying different amounts of logic resources for the dynamic PR region, and the power stress test modules are used as hardware logic for the dynamic PR region operating in the power test mode.

The firmware burning sub-module is configured to: jointly compile the dynamic PR region operating in the blank mode with the static region to generate an FPGA profile and a profile of the dynamic PR region in blank mode as the FPGA firmware with the partial reconfiguration function; and burn and cure the FPGA firmware to the Flash.

In some implementations of the embodiment of the present disclosure, the region pre-division module 401 may further include a dynamic PR profile generation sub-module.

The dynamic PR profile generation sub-module is configured to jointly compile the plurality of power stress test modules with the static region to generate dynamic PR profiles with various power stress levels. The dynamic PR profiles are burned and cured to the Flash in advance, or are burned and cured to the Flash upon receiving the request for power stress test.

In other implementations of the embodiment of the present disclosure, the region pre-division module 401 may further include a stress parameter setting sub-module.

The stress parameter setting sub-module is configured to automatically configure, in response to receiving an instruction for configuring power stress parameters transmitted from the HOST, corresponding stress parameters for power stress test modules of the same level, so as to control a power value of the FPGA acceleration card.

In some other implementations of this embodiment, the static region may include PCIe, a DDR driver, an optical module driver, and a reconfiguration module. Only a connection interface is reserved between the static region and the dynamic PR region. The reconfiguration module is configured to cause the HOST to load, according to the partial reconfiguration method, the dynamic PR profiles to the dynamic PR region through PCIe.

In some implementations of the embodiment of the present disclosure, the stress test configuration module 402 may also be a module that configures, based on a mode adjustment instruction transmitted from the HOST, the operating mode of the dynamic PR region as the power test mode through PCIe.

The functions of each functional module of the apparatus for the power stress test of the FPGA acceleration card according to the embodiment of the present disclosure may be specifically implemented according to the method in the above method embodiment. For the specific implementation process, please refer to the relevant description of the above method embodiment, which will not be repeated herein.

It can be seen from the above that, according to the embodiment of the present disclosure, the firmware with the power stress function may be directly used to perform the power stress test on the FPGA acceleration card without increasing the static power of the FPGA acceleration card.

Figure 5:
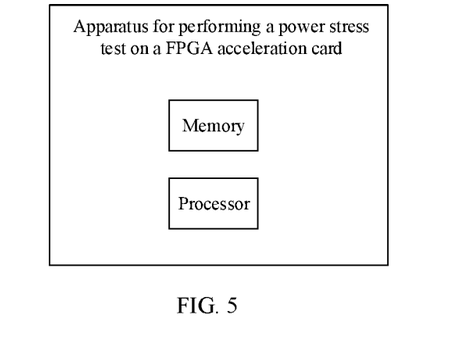
FIG. 5 is a structural diagram illustrating another apparatus for performing a power stress test on an FPGA acceleration card according to an embodiment of the present application.

The above apparatus for performing the power stress test on the FPGA acceleration card is described in term of the functional modules. Further, the present application further provides an apparatus for performing a power stress test on an FPGA acceleration card, which is described in term of hardware. FIG. 5 is a structural diagram illustrating another apparatus for performing a power stress test on an FPGA acceleration card according to an embodiment of the present application. The apparatus includes: a memory, configured to store a computer program; and a processor, configured to, when performing the computer program, implement the steps of the method for the power stress test of the FPGA acceleration card according to any one of the above embodiments.

The memory may include one or more computer-readable storage media which may be non-transitory. The memory may further include a high-speed random access memory, and a non-volatile memory, such as one or more disk storage devices and Flash storage devices. In this embodiment, the memory is configured to store at least the following computer program. The computer program, after being loaded and executed by the processor, is capable of implementing relevant steps of the method for performing the power stress test on the FPGA acceleration card according to any one of the foregoing embodiments. In addition, resources stored by the memory may also include operating systems, data, etc., and may be stored temporarily or permanently. The operating systems may include Windows, Unix, Linux, etc. The data may include, but is not limited to, data corresponding to test results, etc.

In some embodiments, the apparatus for performing the power stress test on the FPGA acceleration card may further include an input/output interface, a communication interface, a power supply, and a communication bus, for example, may further include a sensor.

The functions of each functional module of the apparatus for performing the power stress test on the FPGA acceleration card according to the embodiment of the present disclosure may be specifically implemented according to the method in the above method embodiment. For the specific implementation process, please refer to the relevant description of the above method embodiment, which will not be repeated herein.

It can be seen from the above that, according to the embodiment of the present disclosure, the firmware with the power stress function may be directly used to perform the power stress test on the FPGA acceleration card without increasing the static power of the FPGA acceleration card.

It is to be understood that, if the method for performing the power stress test on the FPGA acceleration card according to the above embodiment is implemented in the form of a software functional unit and sold or used as a separate product, the method may be stored in a computer-readable storage medium. Based on this understanding, that part of the technical solution of the present application that essentially contributes to the related art or all or part of this technical solution may be embodied in the form of a software product. The computer software product is stored in a storage medium, and performs all or part of the steps of the method according to various embodiments of the present application. The aforementioned storage medium includes: a USB flash drive, a removable hard disk, a read-only memory (ROM), a random access memory (RAM), an electrically erasable programmable ROM, a register, a hard disk, a removable disk, a CD-ROM, a diskette or a CD-ROM, and various other media that may store program codes.

Based on the above, an embodiment of the present disclosure further provides a computer-readable storage medium storing a program for performing power stress test on an FPGA acceleration card. The program for performing power stress test on the FPGA acceleration card, when executed by a processor, implements the steps of the method for performing the power stress test on the FPGA acceleration card according to any one of the above embodiments.

The functions of each functional module of the computer-readable storage medium according to the embodiment of the present disclosure may be specifically implemented according to the method in the above method embodiment. For the specific implementation process, please refer to the relevant description of the above method embodiment, which will not be repeated herein.

The firmware with the power stress function may be directly used to perform the power stress test on the FPGA acceleration card without increasing the static power of the FPGA acceleration card.

Various embodiments described in the description are described in a progressive manner, each embodiment focuses on the difference from other embodiments, and the same or similar parts of each embodiment can be referred to each other. The apparatus disclosed in the embodiment corresponds to the method disclosed in the embodiment, thus the description is relatively simple, and for the related information, please refer to the description of the method.

Those skilled in the art can further realize that the exemplary units and algorithm steps described in conjunction with the embodiments disclosed herein can be implemented by electronic hardware, computer software, or a combination of the two. In order to clearly illustrate the interchangeability between hardware and software, the composition and steps of each example have been generally described according to their functions in the above description. Whether these functions are executed by hardware or software depends on the specific application and design constraints of the technical solution. Those skilled in the art may use different methods to implement the described functions for each specific application, but such implementation should not be regarded as exceeding the scope of the present disclosure.

The method and apparatus for performing a power stress test on an FPGA acceleration card, and computer-readable storage medium provided in the present application have been introduced in detail above. Herein, specific examples are used to illustrate the principle and implementation of the present disclosure, and the descriptions of the above embodiments are only used to help understand the method and core idea of the present disclosure. It should be pointed out that for those skilled in the art, without departing from the principle of the present disclosure, some improvements and modifications can also be made to the application, and these improvements and modifications also fall within the protection scope of the claims of the application.

The invention claimed is:

1. A method for performing a power stress test on a field programmable gate array (FPGA) acceleration card, comprising:
    dividing, according to a partial reconfiguration (PR) method, the FPGA acceleration card into a static region and a dynamic PR region in advance, and burning FPGA firmware with a partial reconfiguration function to a Flash memory;

in response to receiving a request for power stress test, setting an operating mode of the dynamic PR region as a power test mode, and loading dynamic PR profiles burned in the Flash memory to the dynamic PR region; and calling power stress test modules to perform the power stress test in the dynamic PR region, wherein the static region is a hardware logic implementation region for a functional test other than the power stress test, the dynamic PR region comprises a blank mode occupying no hardware resource and the power test mode for performing the power stress test, and the dynamic PR region in the blank mode is used for performing a test other than the power stress test in conjunction with the static region.

2. The method according to claim 1, further comprising:
in response to receiving an instruction for configuring power stress test modules transmitted from HOST, generating a plurality of power stress test modules occupying different amounts of logic resources for the dynamic PR region, and the plurality of power stress test modules are served as hardware logic for the dynamic PR region operating in the power test mode.

3. The method according to claim 2, wherein after generating the plurality of power stress test modules occupying different amounts of logic resources for the dynamic PR region, the method further comprises:
generating dynamic PR profiles of various power stress levels by jointly compiling the plurality of power stress test modules with the static region, wherein
the dynamic PR profiles are burned and cured to the Flash memory in advance, or are burned and cured to the Flash memory upon receiving the request for power stress test.

4. The method according to claim 2, wherein after generating the plurality of power stress test modules occupying different amounts of logic resources for the dynamic PR region, the method further comprises:
automatically configuring, in response to receiving an instruction for configuring power stress parameters transmitted from HOST, corresponding stress parameters for power stress test modules of the same level, to control a power value of the FPGA acceleration card.

5. The method according to claim 1, wherein the static region comprises peripheral component interconnect express (PCIe), a double data rate (DDR) driver, an optical module driver, and a reconfiguration module; only a connection interface is reserved between the static region and the dynamic PR region;
wherein the reconfiguration module is configured to cause HOST to load, according to the partial reconfiguration method, the dynamic PR profiles to the dynamic PR region through the PCIe.

6. The method according to claim 5, wherein setting the operating mode of the dynamic PR region as the power test mode comprises:
in response to a mode adjustment instruction transmitted from the HOST, configuring, through the PCIe, the operating mode of the dynamic PR region as the power test mode.

7. An apparatus for performing a power stress test on a field programmable gate array (FPGA) acceleration card, comprising a processor and a memory, wherein the memory is configured to store a computer program, and the processor is configured to call the computer program stored in the memory and run the computer program to:

divide the FPGA acceleration card into a static region and a dynamic partial reconfiguration (PR) region according to a partial reconfiguration method; and burn FPGA firmware with a partial reconfiguration function to a Flash memory, the static region being a hardware logic implementation region for functional tests other than the power stress test, the dynamic PR region comprising a blank mode occupying no hardware resource and a power test mode for performing the power stress test, wherein the dynamic PR region in the blank mode is used for performing a test other than the power stress test in conjunction with the static region;

in response to receiving a request for power stress test, set an operating mode of the dynamic PR region as the power test mode; and load dynamic PR profiles burned in the Flash memory to the dynamic PR region; and call power stress test modules to perform the power stress test in the dynamic PR region.

8. The apparatus according to claim 7, wherein the processor is further configured to:
generate, in response to receiving an instruction for configuring power stress test modules transmitted from HOST, a plurality of power stress test modules occupying different amounts of logic resources for the dynamic PR region, and the plurality of power stress test modules are served as hardware logic for the dynamic PR region operating in the power test mode.

9. A non-transitory computer-readable storage medium storing programs for performing a power stress test on a field programmable gate array (FPGA) acceleration card, wherein the programs for performing the power stress test on the FPGA acceleration card, when executed by a processor, implements steps of:
dividing, according to a partial reconfiguration (PR) method, the FPGA acceleration card into a static region and a dynamic PR region in advance, and burning FPGA firmware with a partial reconfiguration function to a Flash memory;

in response to receiving a request for power stress test, setting an operating mode of the dynamic PR region as a power test mode, and loading dynamic PR profiles burned in the Flash memory to the dynamic PR region; and calling power stress test modules to perform the power stress test in the dynamic PR region, wherein the static region is a hardware logic implementation region for a functional test other than the power stress test, the dynamic PR region comprises a blank mode occupying no hardware resource and the power test mode for performing the power stress test, and the dynamic PR region in the blank mode is used for performing a test other than the power stress test in conjunction with the static region.

10. The method according to claim 1, the burning FPGA firmware with the partial reconfiguration function to the Flash memory comprises:
generating, by jointly compiling the dynamic PR region operating in the blank mode with the static region, FPGA profiles and profiles of the dynamic PR region in the blank mode that are served as the FPGA firmware with the partial reconfiguration function; and
burning and curing the FPGA firmware to the Flash memory.

11. The method according to claim 10, further comprising:

in response to receiving a request for functional test other than the power stress test, setting the operating mode of the dynamic PR region as the blank mode; and performing the functional test other than the power stress test in the static region.

12. The method according to claim 1, wherein the operating mode of the dynamic PR region is set according to an upper-level instruction.

13. The method according to claim 3, wherein loading dynamic PR profiles burned in the Flash memory to the dynamic PR region comprises loading dynamic PR files of different levels according to power stress test requirements of users.

14. The method according to claim 4, wherein different stress parameters are configured for power stress test modules of the same level.

15. The method according claim 1, wherein the partial reconfiguration method is used for reconfiguring internal hardware resources of the FPGA acceleration card.

16. The apparatus according to claim 7, wherein the processor is further configured to:

generate, by jointly compiling the dynamic PR region operating in the blank mode with the static region, FPGA profiles and profiles of the dynamic PR region in the blank mode, the FPGA profiles and profiles of the dynamic PR region in the blank mode being served as the FPGA firmware with the partial reconfiguration function; and burn and cure the FPGA firmware to the Flash memory.

17. The apparatus according to claim 8, wherein the processor is further configured to:

generate dynamic PR profiles of various power stress levels by jointly compiling the plurality of power stress test modules with the static region, wherein the dynamic PR profiles are burned and cured to the Flash memory in advance, or are burned and cured to the Flash memory upon receiving the request for power stress test.

18. The apparatus according to claim 8, wherein the processor is further configured to:

automatically configure, in response to receiving an instruction for configuring power stress parameters transmitted from HOST, corresponding stress parameters for power stress test modules of the same level, to control a power value of the FPGA acceleration card.

19. The apparatus according to claim 7, wherein the static region comprises peripheral component interconnect express (PCIe), a double data rate (DDR) driver, an optical module driver, and a reconfiguration module; only a connection interface is reserved between the static region and the dynamic PR region;

wherein the reconfiguration module is configured to cause HOST to load, according to the partial reconfiguration method, the dynamic PR profiles to the dynamic PR region through the PCIe.

20. The apparatus according to claim 19, wherein the processor is further configured to:

in response to a mode adjustment instruction transmitted from the HOST, configure, through the PCIe, the operating mode of the dynamic PR region as the power test mode.

* * * * *